United States Patent [19]

Kunstatter

[11] 4,101,741
[45] Jul. 18, 1978

[54] LINE CIRCUIT FOR KEY TELEPHONE SYSTEMS

[75] Inventor: George Kunstatter, Kitchener, Canada

[73] Assignee: International Standard Electric Corporation, New York, N.Y.

[21] Appl. No.: 777,041

[22] Filed: Mar. 14, 1977

[51] Int. Cl.² .......................................... H04M 1/00
[52] U.S. Cl. .................................................. 179/99
[58] Field of Search ................ 179/9.9, 18 F, 18 FA, 179/81 R, 84 R

[56] References Cited

U.S. PATENT DOCUMENTS

| | | | |
|---|---|---|---|
| 3,764,752 | 10/1973 | Yachabach | 179/99 |
| 3,766,325 | 10/1973 | Hatfield et al. | 179/99 |
| 3,856,994 | 12/1974 | Ozechoski | 179/99 |
| 3,914,556 | 10/1975 | Frazee | 179/18 F |
| 4,004,106 | 1/1977 | Yachabach | 179/99 |
| 4,039,763 | 8/1977 | Angner | 179/99 |
| 4,064,373 | 12/1977 | Pinede et al. | 179/99 |

Primary Examiner—William C. Cooper
Assistant Examiner—Gerald L. Brigance
Attorney, Agent, or Firm—James B. Raden; Marvin M. Chaban

[57] ABSTRACT

A line circuit for a key telephone system using two relays, a ring delay (B) and a combined off-hook and hold relay (C), and solid state devices including a first and a second optical coupler. On a ring signal from the exchange, the first optical coupler is activated to cause the energization of the ring relay. On a station of the line going off-hook (busy), the conventional A lead ground operates the C relay and causes de-energization of the B relay. When a station of the line goes into hold, the circuit must differentiate this condition from a hang-up condition. This differentiation is performed by sensing the line voltage as low (continued loop closure at the start of hold) or high (open loop at the stations of the line). The C relay is held during this determination so that the circuit may enter the hold condition when indicated. On a high voltage condition, indicating a hang-up condition, the second coupler switches on to prevent the B relay from operating, and thereby preventing the circuit from entering the hold condition.

7 Claims, 1 Drawing Figure

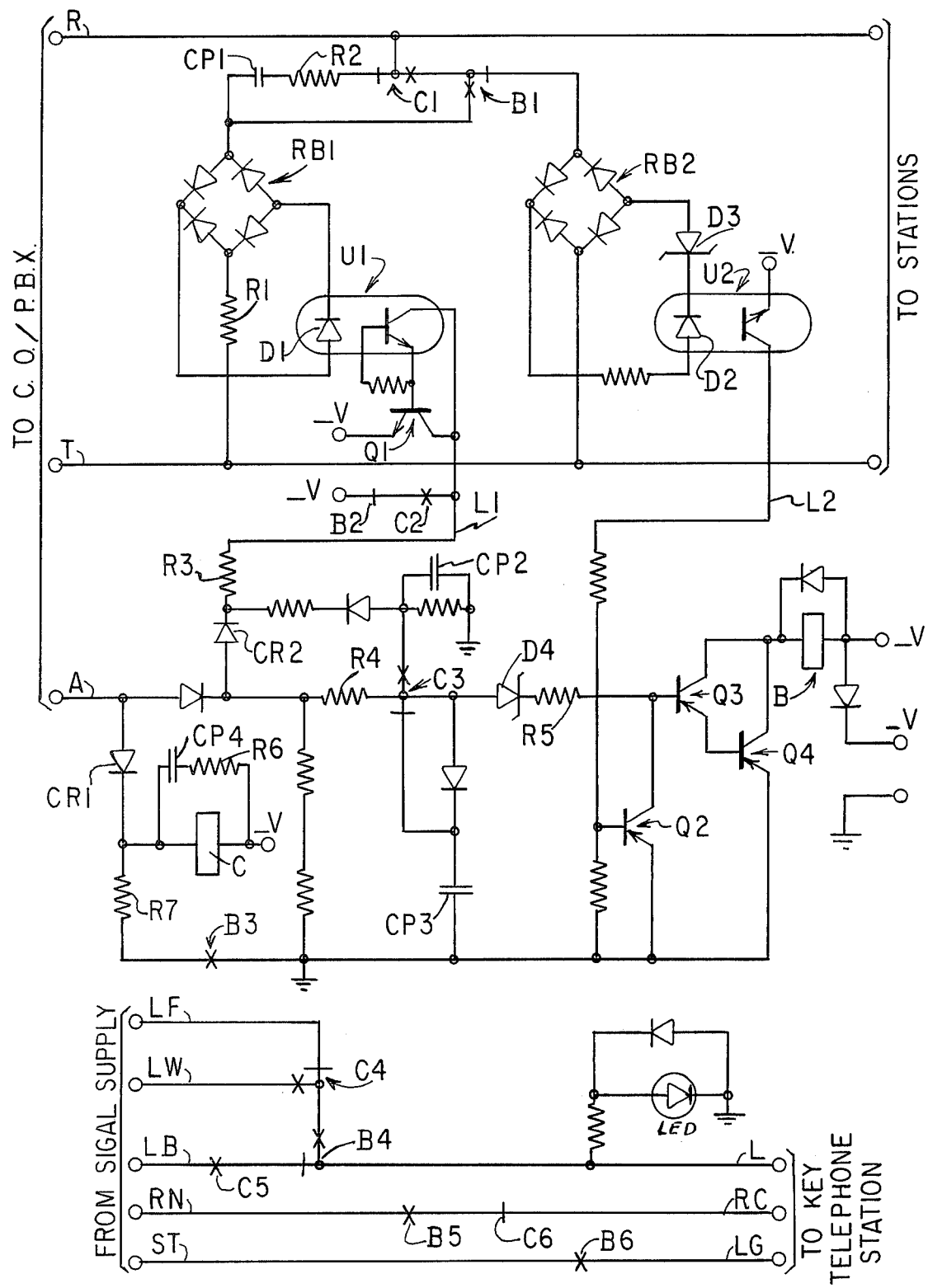

LINE CIRCUIT FOR KEY TELEPHONE SYSTEMS

BACKGROUND OF THE INVENTION

Line circuits for key telephone systems are well-known based on the Bell System 400B line card (U.S. Pat. No. 3,239,610 issued Mar. 8, 1966 to Morse et al.) and the 400D card (U.S. Pat. No. 3,436,488 issued Apr. 1, 1969 to Barbato et al.).

Later reference patents such as U.S. Pat. Nos. 3,647,983 issued Mar. 7, 1972 to Fitzsimons et al. and 3,715,516 issued Feb. 6, 1973 to Ebrahimi show variations using three relays to produce the same results as the cited Barbato patent using the same input conditions and producing the same outputs.

Many subsequent patents have issued for key system line circuit patents, the circuits being essentially plug compatible with those noted, so that all the circuits receive and respond to the same input conditions to produce the same output conditions.

Of these, the more recent employ solid state devices to a larger degree with emphasis on one or more optical isolators or optical couplers performing the function of the line relay. Some of these patents include: U.S. Pat. No. 3,766,325 issued Oct. 16, 1973 to Hatfield et al. and U.S. Pat. No. 3,764,752 issued Oct. 9, 1973 to Yachabach.

SUMMARY OF THE INVENTION

The present invention discloses a two relay line circuit for a key telephone system using a ring control relay (B relay) and combined busy and hold control relay (C relay). These relays combine with two optical couplers to produce the output conditions, there being four such conditions: (1) The line being idle with both relays unoperated; (2) Ringing current being applied to the line to cause the B relay to operate; (3) Answer or busying of the line causing the C relay to operate; and (4) The hold condition to which both the B and C relays respond.

Four operating conditions must be responded to — Ring, Busy, Hold and Hang-Up (on-hook). For Ring, the first optical coupler is switched on to cause the B relay to to initiate local ringing. The ring relay in a conventional manner controls the lamp flash and local ring or buzzer supply to stations of the called line being rung. When a station of the line enters the busy or off-hook condition, the conventional ground on the A lead is fed directly to the C relay to cause the C relay to be energized. The A lead ground also directly shuts off the driver for the B relay, and the relay itself. The C relay on energization switches the lamp lead to a steady on condition and opens the ringing circuits further.

On a hold signal from the off-hook station, the A lead ground is open-circuited in the conventional sequencing before the line loop opens. The C relay remains operated for a timed period sufficiently long to enable a determination as to whether the condition is a hold or hang up. The second optical coupler senses the line voltage. The line voltage being less than a predetermined level indicates that the line loop is still closed.

Before the C relay has released, the line voltage is checked causing operation of one or the other of the optical couplers. Operation of the ring coupler (on low line voltage) causes B relay operation for hold. The optical coupler which had been used as a ring detector now becomes a hold current detector. The presence of hold current causes the B relay to operate during the hold condition. Operation of the second coupler (high line voltage) prevents B relay operation to cause release of the circuit. On a hold determination, a resistance bridge is closed across the line conductors, and the subscriber lamps are pulsed at a wink rate without audible signaling. On a hang-up condition, the second optical coupler fires to close a B relay prevent path to cause the line circuit to restore.

Thus, in the circuit as shown, a first optical coupler responds to ringing signals and to a hold condition by sensing the condition of the line voltage, and a second coupler responds to high line voltage during a transition period to sense a return to idle condition.

It is therefore an object of the invention to provide an improved line circuit for key systems.

It is a further object of the invention to provide a line circuit for key systems which uses a pair of optical couplers to control the relay operating logic in the circuit.

It is still a further object of the invention to provide a line circuit for key systems in which line voltage sensing occurs to determine whether the circuit should enter a hold condition on release of the A lead ground, by operation of one optical coupler, or should restore the circuit to idle on operation of the second optical coupler.

BRIEF DESCRIPTION OF THE DRAWINGS

The single drawing is a schematic circuit diagram of my invention.

DETAILED DESCRIPTION OF THE DRAWINGS:

In the drawing, I show my line circuit with the conventional tip and ring conductors extending from terminals to a C.O. or PBX on one end (left end) and terminals to one or more key telephone stations at the other end (right end).

The subscribers station equipment is similar to that shown in the cited Barbato patent and includes a line key with three hookswitch contacts and hold key contacts. The operation of these contacts is conventional as shown by many key system line circuit patents; the operation of these contacts will only be described where necessary to complete the explanation.

As is also conventional, the circuit must include a ring detector which responds to ring current from the C.O. to activate a local audio and visual signaling source, a busy or off-hook detector to properly condition signals from the signaling source, and a hold detector which differentiates between a hold condition at a station and the station going on-hook to respond to both conditions by operating the signaling accordingly.

For ring detection, I provide a circuit section including a full-wave bridge rectifier RB1 bridged across the line conductors through a path from tip lead T through resistor R1, the bridge RB1, capacitor CP1, resistor R2 and normally closed contacts of contact set C1 (relay C) to the ring lead R. Across the diagonals of the rectifier RB1 is a diode D1 of optical coupler U1. The coupler provides isolation between the A.C. ring detector and the D.C. logic circuit of relays B and C in conventional fashion. The output coupler U1 forwards a ring detection signal to the logic overlead L1.

A second bridge rectifier RB2 in conjunction with optical coupler U2 and zener diode D3 combines to differentiate between the hold and hang-up conditions. The bridge rectifier RB2 is connected to the tip conductor T, but its path to the ring conductor R is normally open at contacts of set C1, and only closes when the C relay is operated. The path to bridge rectifier RB2 is closed only during the off-hook condition due to normally closed contacts B1 of relay B in series with the normally open C1 contacts. Relay B as will be explained, is energized during the ring and hold conditions to open the path at contacts B1 to rectifier RB2 during these conditions.

Across the diagonals of rectifier RB2 is a diode D2 of optical coupler U2 in series with a zener diode D3. The output of the coupler RB2 is connected into the logic circuit over lead L2, as will be explained.

The couplers U1 and U2 provide full isolation between the detection section of the circuit and the D.C. logic circuit.

The D.C. logic circuitry includes two relays B and C, each having one terminal of its single winding connected to minus battery (which may be 24 volts) and the other terminal of the respective windings connected to the logic network, the B relay terminal being connected to an output of a Darlington transistor arrangement (Q3, Q4) and the C relay being connected to the conventional A lead ground through a diode CR1.

Turning to the operation of the circuit, in the idle condition, relays B and C are unoperated. The first optical coupler U1 is inactive since the flow of D.C. current to rectifier RB1 from the line conductors is blocked by capacitor CP1. The path to the rectifier RB2 is open at normally open contacts C1. Thus, no power is applied to either bridge rectifier, and couplers U1 and U2 are shut off. With no ground on the A lead, capacitor CP3 is discharged maintaining transistor Q3 off.

When ringing signals are received from the CO/PBX on the line conductor R, a path may be traced for these AC signals through closed contacts of set C1, resistor R2, capacitor CP1, rectifier bridge RB1 to resistor R1 and the T lead. Coupler U1 responds to the A.C. input and turns on to switch on the Darlington pair formed by the transistor in U1 and transistor Q1. With the Darlington pair on, the main timing capacitor CP3 charges over a path from the voltage source through transistor Q1, resistor R3, diode CR2, R4 and normally closed relay contact C3. The capacitor CR3 prevents response to spurious noise signals in the known manner.

When the charge on capacitor CP3 reaches above the breakdown level of zener diode D4, the voltage through resistor R5 causes transistor Q3 to turn on. Transistor Q3 forms the input of a Darlington circuit with transistor Q4 which turns on to complete an obvious operating path to relay B. Relay B is energized and switches its contacts B1–B6. Contacts B6 close to complete a start path to the interrupter, and contacts B4 and B5 switch to provide visual and audible signaling in a conventional manner. The remaining contacts B1–B3 of relay B switch but perform no function at this time. Note that contacts B3 close but the resistance of resistor R7 is sufficiently high to prevent the C relay from being energized.

If the ringing or calling party hangs up, the input of ringing signals stops after a timed period. With relay C unoperated, no A.C. signals are passed to coupler U1 and the coupler shuts off. With coupler U1 off, transistor Q1 releases and capacitor CP3 discharges to cause transistor Q3 to shut off and restore relay B after the timed period.

In normal circumstances, with ring continuing, the called party may respond by going off-hook. As is known, operation of the hook switch in a station going off-hook places ground on the A lead. The ground on the A lead causes relay C to operate over an obvious path through diode CR1. The line conductors are looped to close a path to the station instrument.

Relay C operates and closes its six contact sets. Of these, contacts C5 connect the lamp lead L to lead LB to provide steady lamp operation. Contacts of contact set C4 open the path to the flashing visual indicator. Contacts C6 open the audio circuit in conventional fashion. Contacts C1 switch to open the circuit to the ring detector and to close a path for the voltage level sensing function of bridge rectifier RB2 and coupler U2. This path may be traced from line conductor R through closed contacts of sets C1 and B1 and rectifier bridge RB2 to the T conductor. Since the closed loop voltage across the looped line conductors T and R is low, the breakdown voltage of zener diode D3 is not reached and coupler RB2 remains off. The ground on the A lead passes through zener diode D4 to shut off transistor Q3 and relay B.

Contacts C3 switch to provide instant turn on power for transistors Q3 and Q4 when "hold" condition is to be established. A clear metallic path is thereby provided between the line conductors on the CO/PBX side and the station side without any impedance elements in the line loop.

From the off-hook condition, a station may enter the hold condition or may release and hang up. The entry into hold condition will be described first. As is conventional, the first response to depression of the hold button is removal of ground from the A lead. The line loop remains closed for a time period after the ground removal as is conventional. The operating path to the C relay is opened on the ground removal, however, the C relay remains operated for a timed period (up to 90 m.s.) determined by the R-C time constant of resistor R6 and capacitor CP4.

With the C relay held operated, an enabling path to coupler U2 is maintained through contacts C1, B1, and rectifier RB2. When the line loop exhibits a low D.C. voltage indicative of a continued closed circuit at the station loop, the path through zener diode D3 will not break down, coupler U2 will not turn on. The natural tendency of the circuit once the A lead ground has been removed is to move toward the hold condition under the effect of the negative voltage from closed contacts B2 and C2. This negative voltage is above the breakdown voltage of zener diode D4 and turns on transistor Q3 energizing the B relay. With relay B operated, a hold path for the C relay is closed through the contacts B3 and resistor R7.

With relays B and C operated, the signaling supply is started to provide the lamp wink signal to the stations of the held line. With the B and C relays operated, and contacts B1 and C1 closed, the hold resistor R1 is bridged across the line through the bridge rectifier.

With a line being held, two possibilities exist, (1) That the line be returned to the answer condition by depression of the line key once again, or (2) That the line is released from the C.O. by an interruption of the line current for a period of at least 100 m.s.

(1) Depression of the line key once again, closes ground on the A lead to maintain the C relay operated over its original path. The ground is fed to the zener diode D4 and shuts off transistor Q3, deenergizing the B relay. With the B relay restored and the C relay operated, the line is then in the busy or off-hook condition with steady lamp signals sent to the line.

When a busy line hangs up (goes on-hook), the ground is removed from the A lead and the circuit attempts to enter the hold condition. The C relay holds temporarily. The line voltage increases to cause the zener diode D3 to break down and conduct. Coupler U2 is turned on to turn on transistor Q2. Transistor Q2 keeps transistor Q3 nonconductive and relay B unoperated. After a time, relay C releases and restores the circuit to idle. The coupler U2 shuts off after contact C1 switches and opens its circuit to the bridge rectifier.

(2) This condition is produced since coupler U1 is no longer conducting thus turning off the negative potential to the drive circuit to relay B. When the contacts of set B3 of relay B are open for at least the 90 m.s., the hold delay of relay C is exceeded and the circuit restores to the idle condition.

From the foregoing, it can be seen that when the line circuit is in the off-hook condition (C relay operated), and the line station goes on-hook, the B relay must be prevented from being energized. The optical coupler U2 is turned on by the line voltage (−48v) through contacts C1 and B1 to prevent a hold condition by turning on transistor Q2. The coupler U2 senses line voltage to operate responsive to the open loop or line voltage. On a low voltage condition resulting from the loop remaining closed for a timed period after the A lead ground has been removed, coupler U2 remains off and the line circuit enters the hold condition by operating transistor Q3 to operate the B relay and hold the C relay.

The circuit, as shown, employs one optical coupler as a ring detector to sense the rectified ringing current. A second coupler is used to sense the transition from off-hook to on-hook and to prevent the circuit from entering the hold condition. Neither coupler is energized during the off-hook condition over a path through contacts C1 and B1 and zener diode D3. During hold, coupler U1 conducts to maintain relay B operated, while coupler U2 remains shut-off due to the closed loop voltage being below the breakdown voltage of zener diode D3. Coupler U2 conducts only during the transition stage from off-hook with relay C operated (contacts C1 closed) and relay B released (B1 closed) and the line voltage elevated above the breakdown voltage of diode D3. This latter condition only occurs with the line loop open to prevent the circuit from entering the hold condition until relay C releases.

I claim:

1. A line circuit for a key telephone system which comprises a ring detecting means for causing operation of a first relay to initiate local signaling on occurence of ringing current applied to the line conductors, a second relay operated in response to an off-hook condition at a station of said line circuit, means for deenergizing said first relay in response to said off-hook signal, line voltage sensing means, means responsive to operation of said second relay for enabling said line voltage sensing means to determine the voltage across said line, said line voltage sensing means maintained in an off condition during off-hook and hold conditions, means for switching said voltage sensing means on in response to an open loop across said line conductors to prevent said first relay from operating and for preventing said line circuit from entering the hold condition.

2. A line circuit as claimed in claim 1, in which said ring detecting means and said line voltage sensing means each comprise in combination a rectifier bridge and an optical coupler.

3. A line circuit as claimed in claim 2, in which said line voltage sensing means includes a zener diode for preventing the switching on of the optical coupler of said voltage sensing means only when the voltage across the voltage sensing rectifier bridge exceeds a predetermined voltage.

4. A line circuit as claimed in claim 2, in which the coupler of said ring detecting means is switched on responsive to a hold signal applied to the line conductors and the coupler of said voltage sensing means is shut off.

5. A line circuit for a line of a key telephone system comprised of a pair of line conductors, means for detecting ringing current applied across said line conductors, said ring detecting means including a rectifier bridge and an optical coupler connected to output terminals of said bridge, said coupler responsive to detection of ring current across the line conductors for causing operation of local ring control means, means for preventing operation of said ring control means in response to an off-hook signal applied to said line circuit, means for causing operation of said ring control means during a hold signal applied across said line conductors to cause operation of said ring control means, and means for bridging a resistance in said ring control circuit across the line conductors responsive to a hold signal.

6. A line circuit as claimed in claim 5, in which said preventing means comprises line voltage sensing means includes in combination a rectifier bridge connected across the line conductors, an optical coupler with its input terminals connected across the diagonal of said rectifier bridge, and a zener diode in series between an output terminal of said last mentioned bridge and coupler.

7. A line circuit as claimed in claim 6, in which there is a hold prevention circuit coupled to said line voltage sensing means to prevent said line circuit entering a hold condition when voltage above the breakdown of said zener diode is sensed across the line conductors.

* * * * *